United States Patent
Chhabra et al.

(10) Patent No.: US 8,819,455 B2
(45) Date of Patent: Aug. 26, 2014

(54) PARALLELIZED COUNTER TREE WALK FOR LOW OVERHEAD MEMORY REPLAY PROTECTION

(71) Applicants: Siddhartha Chhabra, Hillsboro, OR (US); Uday R. Savagaonkar, Portland, OR (US); David M. Durham, Beaverton, OR (US); Niranjan L. Cooray, Folsom, CA (US); Men Long, Beaverton, OR (US); Carlos V. Rozas, Portland, OR (US); Alpa T. Narendra Trivedi, Hillsboro, OR (US)

(72) Inventors: Siddhartha Chhabra, Hillsboro, OR (US); Uday R. Savagaonkar, Portland, OR (US); David M. Durham, Beaverton, OR (US); Niranjan L. Cooray, Folsom, CA (US); Men Long, Beaverton, OR (US); Carlos V. Rozas, Portland, OR (US); Alpa T. Narendra Trivedi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 139 days.

(21) Appl. No.: 13/646,105

(22) Filed: Oct. 5, 2012

(65) Prior Publication Data

US 2014/0101461 A1    Apr. 10, 2014

(51) Int. Cl.
*G06F 11/30*    (2006.01)
*G06F 12/14*    (2006.01)

(52) U.S. Cl.
USPC .......................................................... 713/193

(58) Field of Classification Search
USPC .......................................................... 713/193
See application file for complete search history.

(56) References Cited

U.S. PATENT DOCUMENTS

| | | | |
|---|---|---|---|
| 2002/0087936 A1* | 7/2002 | Self et al. ..................... | 714/800 |
| 2002/0169942 A1 | 11/2002 | Sugimoto | |
| 2003/0044007 A1 | 3/2003 | Matthews | |
| 2007/0237332 A1* | 10/2007 | Lyle ............................. | 380/263 |
| 2008/0147627 A1* | 6/2008 | Natkovich et al. ............... | 707/4 |
| 2009/0019551 A1* | 1/2009 | Haga et al. ..................... | 726/27 |
| 2010/0057647 A1* | 3/2010 | Davis et al. .................... | 706/12 |
| 2010/0250965 A1 | 9/2010 | Olson et al. | |

OTHER PUBLICATIONS

"Memory Encryption"; Author: Chhabra, Siddhartha; Rogers, Brian; Solihin, Yan; Prvulovic, Milos; Journal of ACM; vol. 5; Issue 4; Mar. 1, 2009; pp. 16-35).*
"Memory Protection"; Author: Shetty, R; Kharbutli, M; Solihin, Y; Prvulovic, M; IBM Journal of Research and Development; vol. 50; Issue 2/3; Mar.-May 2006; pp. 261-275).*
PCT Search Report mailed Aug. 27, 2012, PCT Appln. No. PCT/US2011/067590.

* cited by examiner

*Primary Examiner* — Kambiz Zand
*Assistant Examiner* — Stephen Sanders
(74) *Attorney, Agent, or Firm* — Blakely, Sokoloff, Taylor & Zafman LLP

(57) ABSTRACT

A processor includes a memory encryption engine that provides replay and confidentiality protections to a memory region. The memory encryption engine performs low-overhead parallelized tree walks along a counter tree structure. The memory encryption engine upon receiving an incoming read request for the protected memory region, performs a dependency check operation to identify dependency between the incoming read request and an in-process request and to remove the dependency when the in-process request is a read request that is not currently suspended.

21 Claims, 13 Drawing Sheets

DEPENDENCY CHAIN: A → B → C

DEPENDENCY CHAIN: A → B

DEPENDENCY CHAIN: A → B → C → D

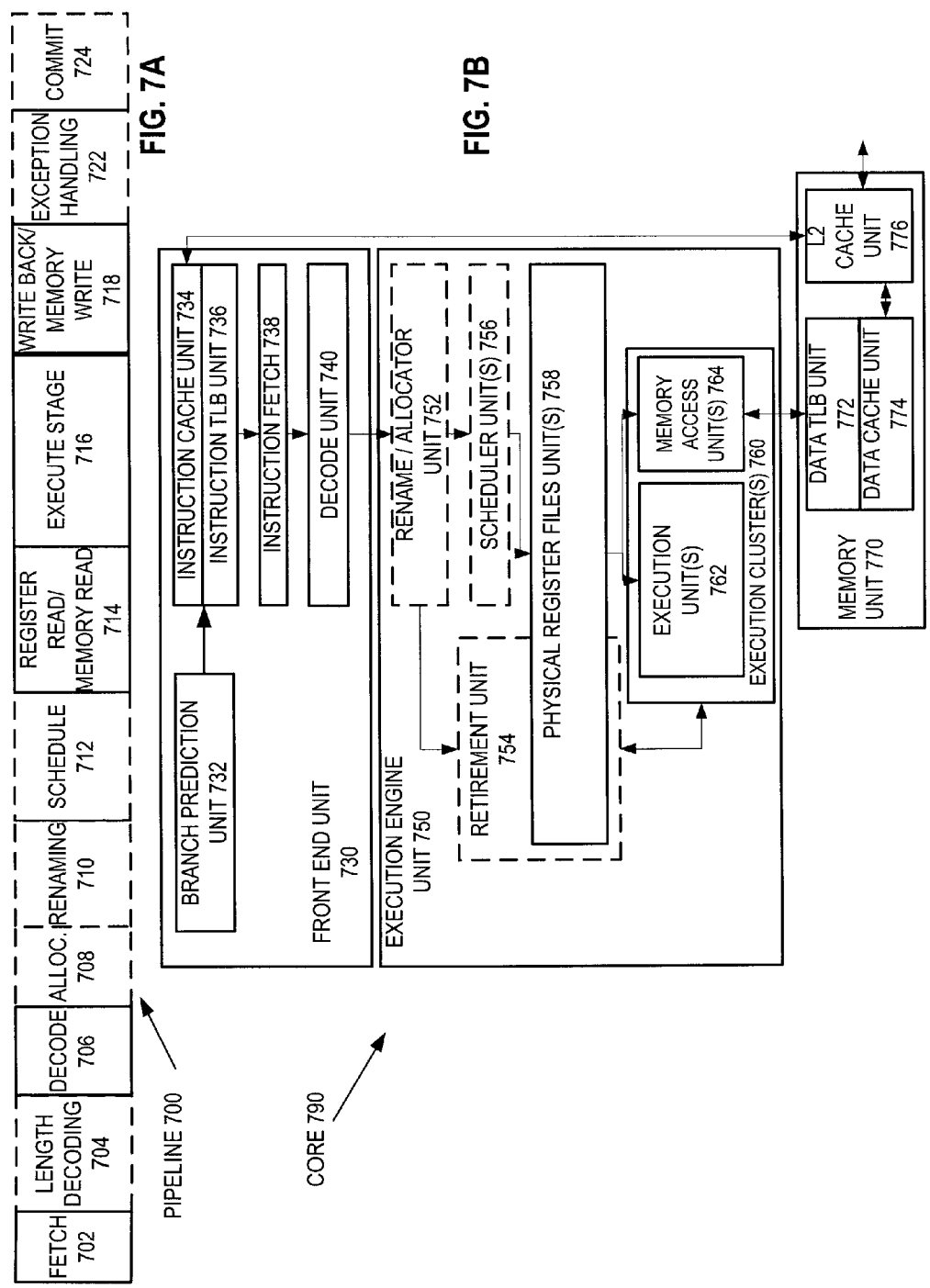

PARALLELIZED COUNTER TREE WALK FOR LOW OVERHEAD MEMORY REPLAY PROTECTION

TECHNICAL FIELD

The present disclosure pertains to computer systems; more specifically, to protection of data stored in the memory of a computer system.

BACKGROUND ART

Modern processors are designed to protect sensitive data in memory from both hardware and software attacks. Some processors provide cryptographic mechanisms for encryption, integrity, and replay protection. Memory encryption protects the confidentiality of memory-resident data. On the other hand, integrity protection prevents an attacker from causing any hidden modifications to the ciphertext (i.e., encrypted data, as opposed to plaintext which is unencrypted data) in memory, and replay protection eliminates any undetected temporal substitution of the ciphertext. In the absence of such protections, an attacker with physical access to the system can record snapshots of data lines and replay them at a later point in time.

Memory encryption is primarily designed to protect against passive attacks where an attacker tries to silently observe the data lines as the data lines move on and off the processor die. Some processors include an encryption module that encrypts sensitive data before the data is stored into a protected region of the memory. On a memory read to the protected region, the data line is decrypted before being fed into the processor.

The encryption and decryption algorithms can be chosen based on the security level required by the user. One possible choice of encryption is counter mode encryption. In counter mode encryption, the cryptographic task of encrypting/decrypting a data line is decoupled from the data itself. An example of counter mode encryption uses the $AES_k$ encryption algorithm to encrypt a seed, which is uniquely associated with each data line but independent of the data.

CryptoPad=$AES_k$(Seed);
Encryption=Plaintext XOR CryptoPad;
Decryption=Ciphertext XOR CryptoPad.

To ensure the security of counter mode encryption, the seed needs to be unique both spatially and temporarily. Spatial uniqueness can be achieved by using the address of the data line as a component of the seed. Temporal uniqueness, on the other hand, can be achieved by associating a per-line counter with the data line subject to encryption. This counter is incremented each time the associated data line is written back to memory. This counter acts as the version of the data line.

Some processors implement a counter tree structure, which stores the version of each protected data line at the lowest level of the tree. The upper levels of the tree store a hierarchy of counters. The counter tree structure is stored in memory except the top level counters which are stored within the processor. This counter tree structure protects the memory region from replay attacks by a chain of verification operations. A write to a protected data line modifies a corresponding tree node at each level of the counter tree. When the protected data line is read, the processor verifies the value of the corresponding tree node at each level of the counter tree to authenticate the read result.

The existing replay protection algorithm suspends the processing of an incoming request if the request shares a tree node at any level of the counter tree structure with any of the requests in process. Thus, the processing of different memory requests is serialized, which increases memory access latency and degrades system performance.

BRIEF DESCRIPTION OF THE DRAWINGS

Embodiments are illustrated by way of example and not limitation in the Figures of the accompanying drawings:

FIG. 7A is a block diagram of an in-order and out-of-order pipeline according to one embodiment.

FIG. 7B is a block diagram of an in-order and out-of-order core according to one embodiment.

DESCRIPTION OF THE EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments of the invention provide a replay protection mechanism for processing read requests in parallel to thereby significantly lower access latency to the protected memory. The replay protection mechanism removes serialization of read requests imposed by the existing request suspension algorithm. The replay protection mechanism tracks duplicated requests incurred by the parallel processing of read requests and prevents duplicated operations from being executed more than once to reduce overhead. In one embodiment, the mechanism is performed by an enhanced memory encryption engine (also referred to as MEE) located on the processor die to perform data encryption and integrity/replay protections against passive and active attacks, respectively. It should be noted that the embodiments described herein are applicable to a class of counter mode encryption methods using counter trees for the purpose of replay protection. The MEE described herein represents only one instance and is used as an example in the following description.

Statistically, read requests form a large component of the overall requests issued to a memory controller. Hence, parallel processing of read requests can achieve significant performance improvement.

Figure 1:
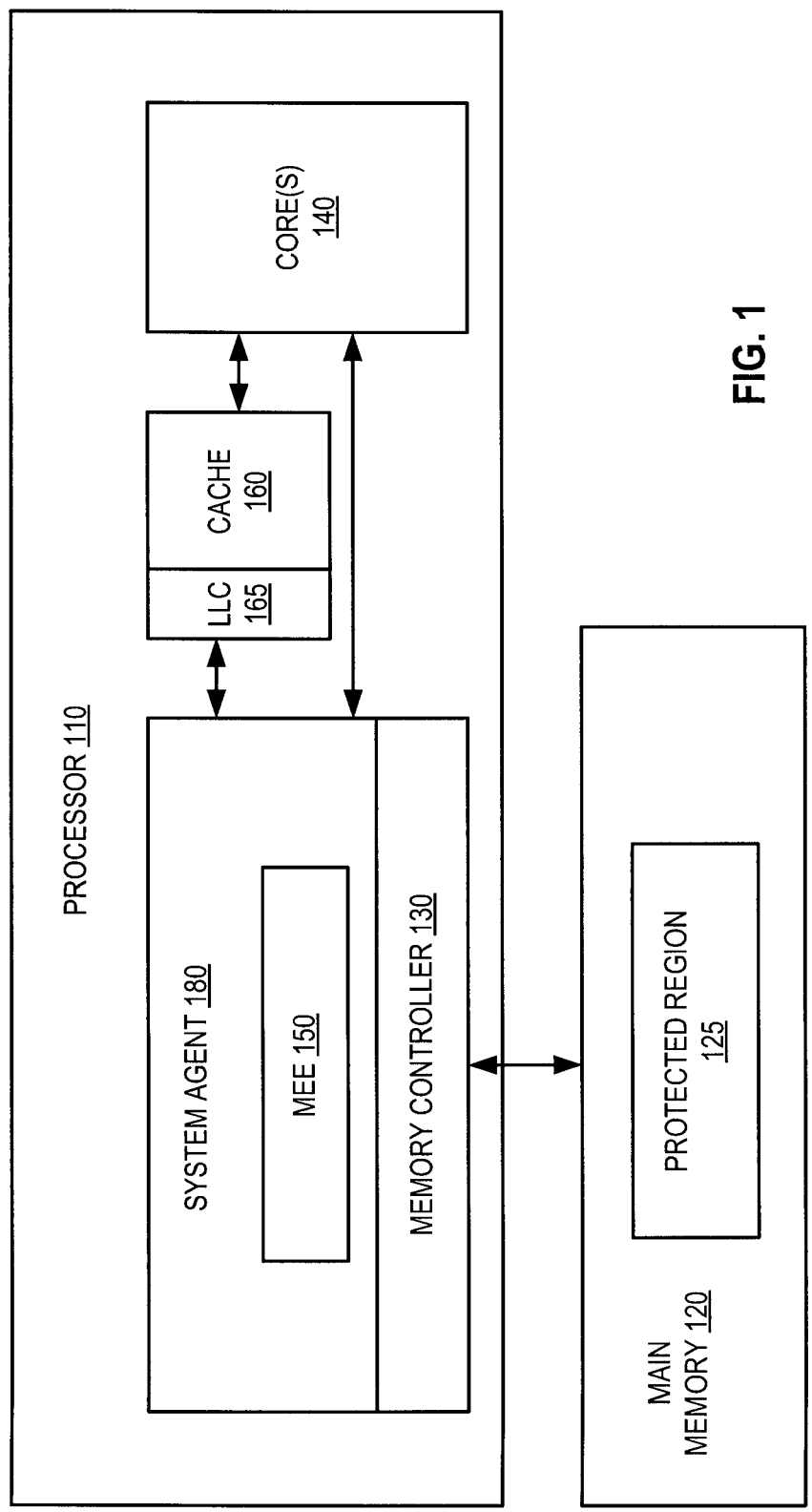
FIG. 1 is a block diagram of a processor including a memory encryption engine according to one embodiment.

FIG. 1 is a block diagram illustrating an embodiment of a processor 110 that executes memory encryption operations for confidentiality, integrity and replay protections. The processor 110 may be used in a system that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processor 110 may be used in a system on a chip (SOC) system.

The processor 110 includes one or more processing cores 140 to execute instructions of the system. The processing core 140 includes, but is not limited to, pre-fetch logic to fetch instructions, decode logic to decode the instructions, execution logic to execute instructions and the like. The processor 110 includes a cache 160 to cache instructions and/or data. The cache 160 includes, but is not limited to, level one, level two, and a last level cache (LLC) 165, or any other configuration of the cache memory within the processor 110.

The memory controller 130 performs functions that enable the processor 510 to access and communicate with a main memory 120 that includes a volatile memory and/or a non-volatile memory. In one embodiment, the memory controller 130 is coupled to a system agent 180 that includes an MEE 150. In one embodiment, the MEE 150 is located between the last level cache 165 and the memory controller 130 to perform encryption, decryption and authentication of the data lines moving in and out of a protected region 125 of the main memory 120. The MEE 150 is located on the processor die, while the memory 120 is located off the processor die.

According to one embodiment of the invention, the MEE 150 processes multiple memory read requests in parallel to improve the access latency to the protected region 125. The MEE 150 performs counter mode encryption in which the encryption seed is unique to a data line both temporally and spatially. As described before, spatial uniqueness can be achieved by using the address of the data line to be accessed, while temporal uniqueness can be achieved by using a counter that serves as the version of the data line. In one embodiment, the MEE 150 also protects the data lines in the protected region 125 of the main memory 120 using a counter tree structure. The versions of the data lines are part of this counter tree structure. An embodiment of the counter tree structure is described in detail below with reference to FIG. 2.

Figure 2:
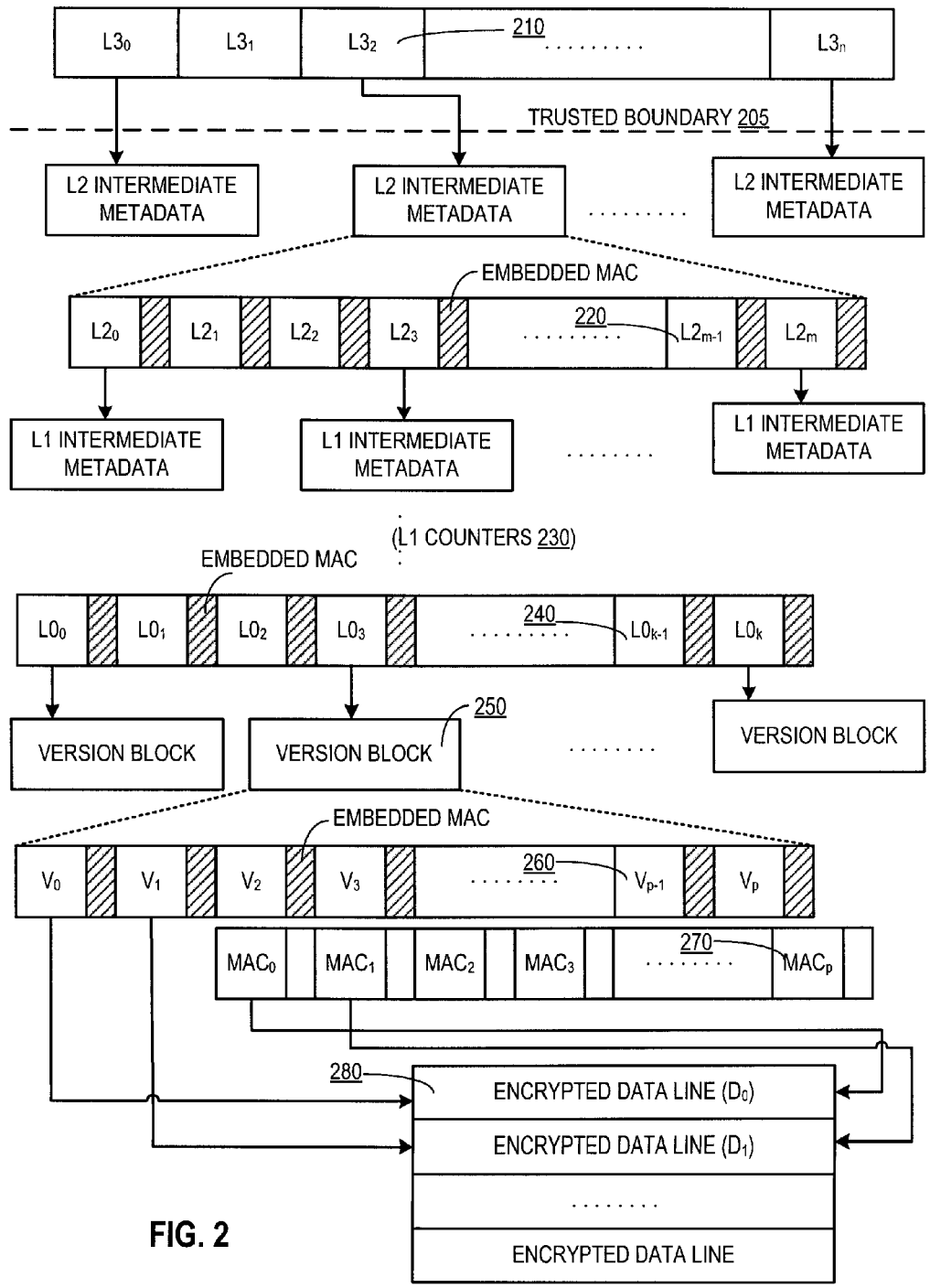
FIG. 2 illustrates an example of a counter tree structure used by counter mode encryption according to one embodiment.

FIG. 2 illustrates a counter tree structure for integrity and replay protections according to one embodiment of the invention. It should be noted that the counter mode encryption described herein represents an example; embodiments of the invention can work with alternative mechanisms of counter mode encryption. In alternative embodiments there may be more or fewer levels in the counter tree structure than what is shown in FIG. 2.

The counter tree structure includes a hierarchy of levels of tree nodes. The top (root) level includes a sequence of on-die counters (i.e., L3 counters 210), which are stored in the internal storage of the processor die. The internal storage includes, but is not limited to, the on-die Static Random Access Memory (SRAM), register files, and any other suitable memory in the processor die. As the L3 counters 210 are on the processor die, their contents are trusted and secure from passive and active attacks. However, the trusted boundary (shown as a dotted line 205) ends at the L3 counters 210. In one embodiment, the lower levels of the counter tree lie outside of the process die (e.g., in the main memory 120 of FIG. 1).

In one embodiment, each L3 counter 210 is linked to a block of L2 intermediate metadata, which contains a sequence of L2 counters 220. Each L2 counter 220 is linked to a block of L1 intermediate metadata, which contains a sequence of L1 counters 230. The blocks representing the L1 intermediate metadata and the L1 counters 230 are omitted from FIG. 2 for simplicity of illustration. Each L1 counter 230 is linked to a block of L0 intermediate metadata, which contains a sequence of L0 counters 240. Each L0 counter 240 is linked to a version block 250, which contains a sequence of version nodes (represented by "V") 260. Each version node 260 is associated with an encrypted data line 280 in the protected region 125 of the main memory 120. The content of a version node 260 is the version of the associated data line, which provides a temporal component of the encryption seed in the counter mode encryption. As the lower-level counters (including L2, L1 and L0 counters and the version nodes 260) are off the processor die and therefore are susceptible to attacks, each counter and each version node are encoded with an embedded Message Authentication Code (MAC) (shown as the blocks with hatched lines) to ensure their integrity.

In one embodiment, each embedded MAC is computed over the line in which they are embedded, using a corresponding counter from the next higher level as input. In the example of FIG. 2, the embedded MAC for the version block 250 associated with $L0_3$ (shown in FIG. 2 as the middle version block) is computed using the values of $V_0-V_p$ and its corresponding L0 counter ($L0_3$). The value of this embedded MAC is stored striped in the line of the version blocks 250 (shown as striped boxes in FIG. 2). The embedded MAC for each line of L0, L1 and L2 is computed similarly. L3 counters do not need embedded MACs because the contents of L3 counters are within the trusted boundary 205.

The entire counter tree built over the protected memory region, starting from the versions up to the L3 counters, provides replay protection to the data lines in the protected memory region. The process of replay protection is as follows. When a processor performs a read operation or a write operation to a data line, the MEE 150 loads a branch of the counter tree that contain tree nodes (also referred to as branch nodes) identified by the address of the data line. The process of loading the tree nodes along a branch and verifying the authenticity of their values is herein referred to as a tree walk. Tree walks proceed from the bottom level of the counter tree (i.e., the version nodes 260) to the root nodes (i.e., the L3 counters). The authenticity of the tree node values needs to be verified because a major portion of the tree structure is resident in the main memory and therefore is susceptible to attacks. In case of a write, the tree walk is performed to verify the authenticity of the branch nodes values and update those values. In case of a read, the tree walk is also performed to verify the authenticity of the branch nodes values but without updating those values. In one embodiment, the MEE 150 contains a finite state machine circuitry that implements the tree walk.

In one embodiment, each encrypted data line 280 is encoded with a MAC node 270 containing a MAC computed from the content of the data line 280. Each time the data line is written back to memory, the MEE 150 (of FIG. 1) updates this MAC to reflect the most recent data value stored in memory. When a data line is read from memory, the MEE 150 verifies the value of its associated MAC node 270 to establish the integrity of the data line being read. The use of the MAC nodes 270 provides integrity protection against modification attacks on a memory-resident data line.

When the processor executes a write operation to write back one of the encrypted data lines 280 into the protected memory region (e.g., when evicting a data line from an on-die last level cache to the protected region in the main memory), the MEE 150 identifies the version node 260 and the L0, L1, L2 and L3 counters (210-240) associated with that data line. The MEE 150 updates the MAC 270 associated with the data line and increments the version of that data line in the identified version node 260. In addition, the MEE 150 also updates the identified L0, L1, L2 and L3 counters (210-240) of that data line, as well as the embedded MAC associated with the updated version and the counters. This update process proceeds from the bottom level of the counter tree up to the root level of L3 counters, which are stored securely on the chip on the processor die and hence are guaranteed protection against attacks. The counters at each level of the counter tree act as the versions for the next lower level ending with the version nodes 260 storing the versions for the data lines. Hence, on a write to a data line, all of counters (including the version) and their associated embedded MACs along the branch identified by the data line's address are updated to reflect the version update.

In order to ensure replay protection, each time a data line is loaded from the protected region it is verified for authenticity against the tree nodes up to the root of the counter tree. A mismatch at any level indicates a potential attack and raises a security exception, thereby defeating the attack. Specifically, when a processor executes a read operation on one of the encrypted data lines 280, the MEE 150 identifies the version and the L0, L1, L2 and L3 counters (210-240) of that data line. Read operations do not alter the values of the version and the L0, L1, L2 and L3 counters (210-240). Upon a read operation, the MEE 150 verifies the MAC 270 associated with the data line. In addition, the MEE 150 verifies the embedded MAC associated with each of the version, L0, L1, L2 and L3 counters (210-240). This verification process proceeds from the bottom level of the counter tree up to the secure root counter L3.

In one embodiment, the tree nodes loaded in a tree walk are cached locally in an MEE cache, which is a local cache of the MEE 150. The MEE cache stores the values of the tree nodes (including the version nodes and the embedded MACs) that have been verified by previous requests. The content of the MEE cache is secure because it is located on the processor die. For read operations, a tree walk is terminated when the first node along the branch of the tree walk is found in the MEE cache. For write operations, a tree walk is terminated when the first node along the branch of the tree walk is found in the MEE cache and that the cached tree node is in the modified state.

To ensure that the counter tree returns correct counter values for all requests, on a write request the MEE 150 completes the update to all of the tree nodes along the write request's branch before any other request (read or write) sharing any of those tree nodes can proceed. As read requests do not alter the values of the counter tree, some of the read requests may be processed in parallel even though these read requests share one or more of the tree nodes in the counter tree.

Figure 3B:
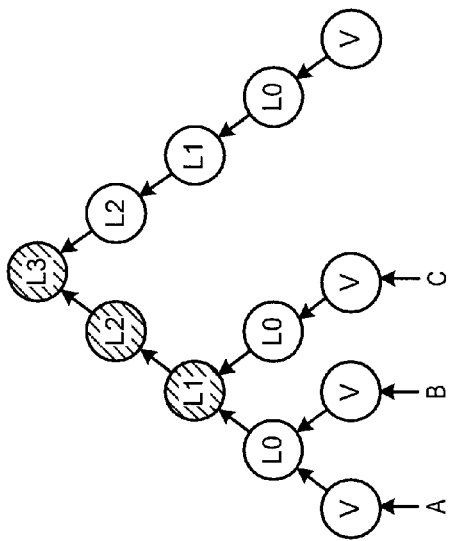
FIGS. 3A-3C illustrate an example of a dependency chain according to one embodiment.
Figure 3A:
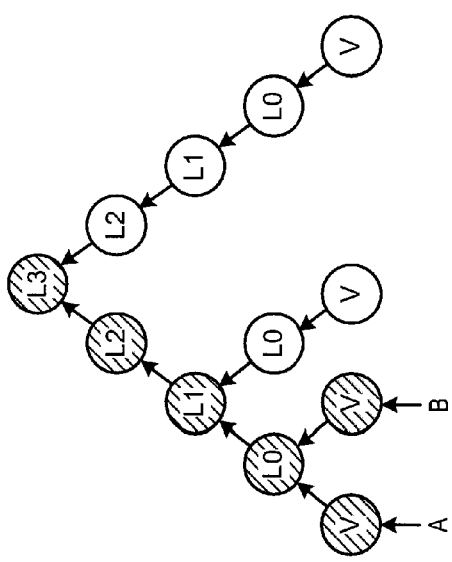
Figure 3C:
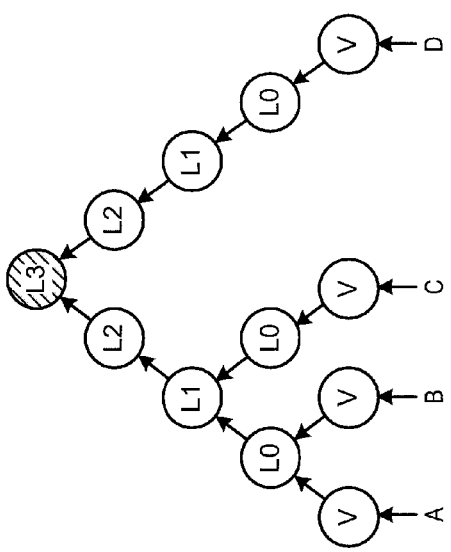

FIGS. 3A-3C illustrate examples of dependencies among the read requests submitted to the MEE 150. Assume that four read requests (A, B, C, and D) for accessing the protected memory region arrive back to back in subsequent cycles. To ensure that the encrypted data lines read from the protected memory region is free of integrity and replay attacks, the MEE 150 needs to verify the tree node values associated with the data lines being read. The four requests in this example share some of the tree nodes, and therefore a dependency chain is established among them. FIG. 3A shows that requests A and B have their versions on the same cache line (or equivalently, the same tree node) and likewise share all the nodes in their branches along the counter tree up to the root L3 counter. In the examples, the shared tree nodes are shown with hatched lines. Since request B came in after request A for processing, request B is made dependent on request A.

FIG. 3B shows that request C arrives in the next cycle. Since request C shares the same L3 counter with request B (as well as the L2 counter and the L1 counter), request C is made dependent on request B. The sharing shown in FIG. 3B is from level L1 upwards. Similarly, FIG. 3C shows that request D shares the L3 counter with request C and is made dependent on request C. The sharing shown in FIG. 3C is at the last level, i.e., L3.

FIGS. 3A-3C also illustrate a dependency chain formed by the requests. In the dependency chain, a newly arrived request is made dependent on the last request in the chain. In one embodiment, the MEE 150 keeps track of the last request in each dependency chain in a data structure, where each request arrives at the MEE 150 is associated with a LinkTail field. A set LinkTail field indicates that its associated request is the last request in a dependency chain.

With a serialized dependency algorithm, request B is released (i.e., starts the tree walk) only when the processing of request A is complete. The tree walk for request C starts once request B has completed its walk. The tree walk for request D starts once request C completes its walk.

Embodiments of the invention enable parallelized tree walk that allows multiple read requests to proceed in parallel. The parallelized tree walk reduces the overhead for integrity and replay protections. The parallelized tree walk is based on the observation that read requests need not be serialized, as read does not modify any counter value in the counter tree.

However, write operations update the counter values in the counter tree so proper ordering needs to be maintained. Dependency needs to be enforced for requests that involve a write to ensure that the correct counter values are used to perform authenticity checks.

In one embodiment, the MEE 150 performs a dependency check upon receiving an incoming read request to determine whether the incoming read request shares any of the tree nodes with a previously received read request that is being processed by the MEE 150, and whether parallelized tree walks can be performed in the presence of the sharing of the tree nodes.

Figure 4:
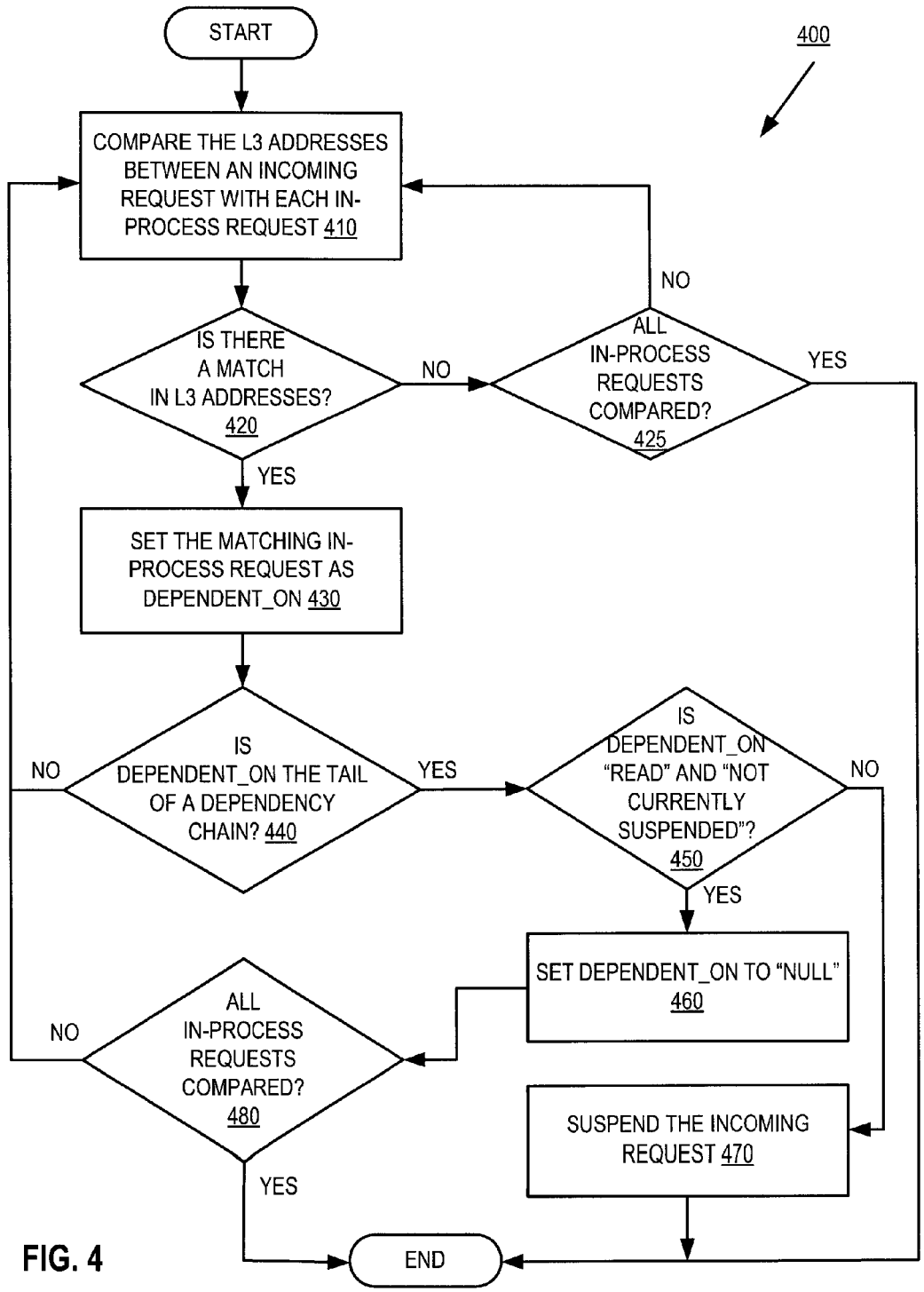
FIG. 4 illustrates components within a memory encryption engine according to one embodiment.

FIG. 4 is a flow diagram illustrating a dependency check method 400 for read requests according to one embodiment of the invention. In one embodiment, the method 400 is performed by the MEE 150 of FIG. 1, although alternative embodiments may also be used.

In one embodiment, when the MEE 150 receives an incoming read request, it compares the L3 counter address for this request with the L3 counter address for each of the in-process requests (i.e., the requests that are currently being processed by the MEE 150) (block 410). If there is a match in the L3 counter addresses between the incoming request and an in-process request (block 420), the MEE 150 sets that in-process request as a "dependent_on" request for the incoming request (block 430). If there is not a match (block 420), the operation continues until all of the in-process requests have been compared (block 425).

If a matching in-process request is found at block 420, the MEE 150 further checks if the dependent_on request is a tail of a dependency chain (block 440). If it is not a tail, the operation return to block 410 to find another in-process request that has a matching L3 counter address and is a tail of a dependency chain. If the dependent_on request is a tail of a dependency chain (block 440), the MEE 150 further checks whether the dependent_on request is a read request and is not currently suspended (block 450). If the condition of block 450 is false, the MEE 150 suspends the incoming request (block 470). If the condition of block 450 is true (i.e., the dependent_on request is a read request and is not currently suspended), the "dependent_on" for the incoming request is reset to "NULL," which means that the incoming request will not be suspended due to this dependent_on request (block 460). The operation of method 400 continues until the MEE 150 determines to suspend the incoming read request (block 470), or determines not to suspend the incoming request after all of the in-process requests are compared (blocks 425 and 480).

The MEE 150 checks an incoming read request for dependency by executing the method 400. If the incoming read request is found to be dependent on a read that is not currently suspended, the output of the dependency check is ignored and the incoming read request is allowed to start its processing.

In some embodiments, the operations described in FIG. 4 can be performed in parallel with respect to the in-process requests. For example, each in-process request can maintain its L3 address and its LinkTail bit. The LinkTail bit is set only when the corresponding in-process request is the last entry in a dependency chain. The LinkTail bits of all of the in-process requests form a LinkTail vector. When an incoming request is admitted to the MEE 150, the L3 address of the incoming request is compared with the L3 addresses of all the in-process requests in parallel, and an L3Match bit vector is generated as the result. If there is a match in the L3 addresses between the incoming request and an in-process request, the bit corresponding to that in-process request in this L3Match bit vector is set. Then the L3Match bit vector is ANDed with the LinkTail vector. A bit value of one in the resulting vector indicates that the corresponding in-process request is a dependent on request for the incoming request. The operation can proceed to blocks 450, 460 and 470 of FIG. 4 to determine whether the incoming request should be suspended.

However, allowing two requests to proceed in parallel can result in duplicated operations in some scenarios. In the example of FIG. 3A, requests A and B can cause the MEE 150 to issue requests for accessing the same tree nodes in memory, thus wasting memory bandwidth. As another example, requests A and B can cause the MEE 150 to perform duplicated authentication for the shared tree nodes, thus wasting cryptographic resources and power. Embodiments of the invention include circuitry that tracks duplicated requests caused by read requests that are processed in parallel, and prevents duplicated operations from being executed by the MEE 150. In one embodiment, this circuitry is a request tracker (also referred to as a scoreboard) in the MEE 150.

Figure 5:
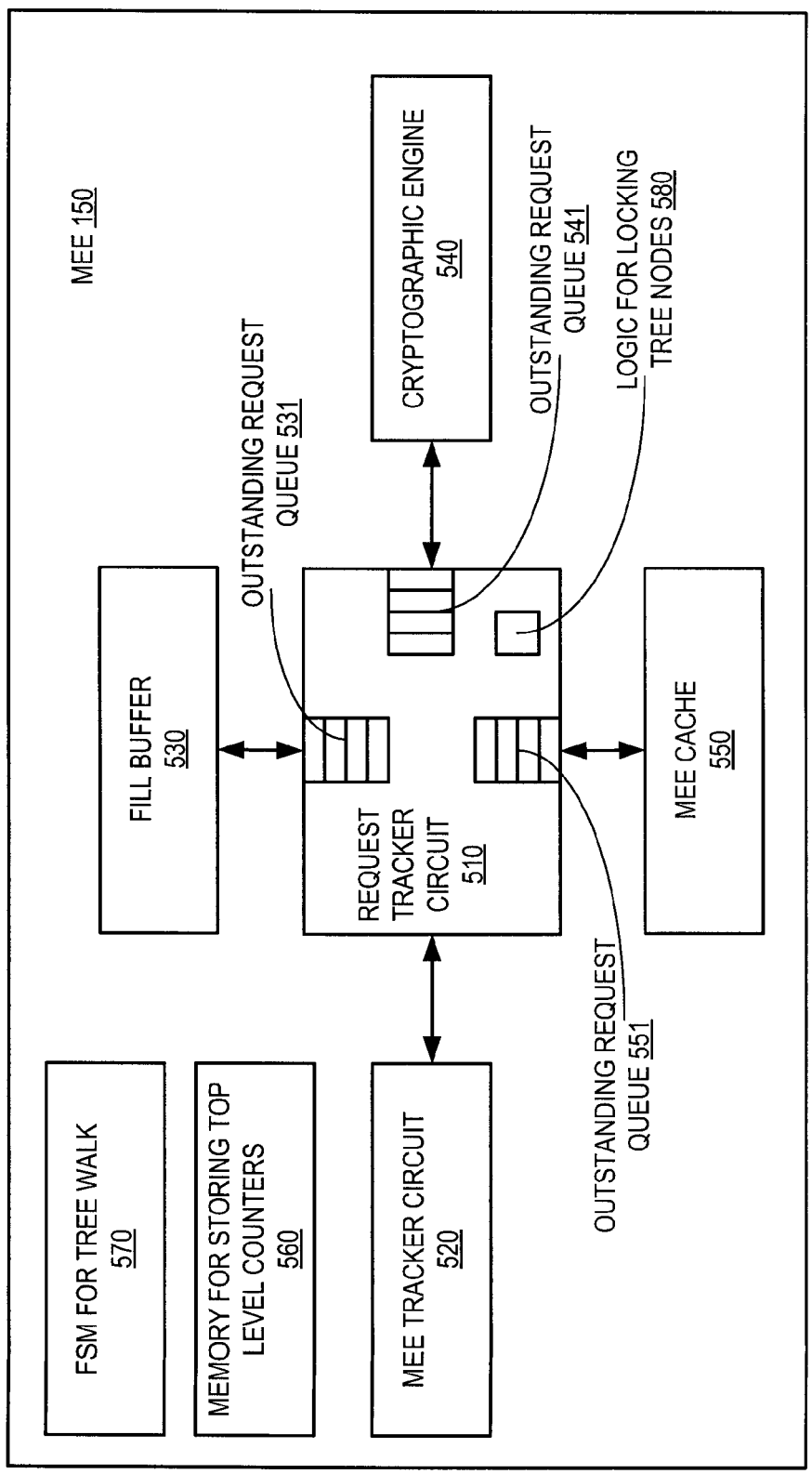
FIG. 5 is a flow diagram illustrating a method of parallelized tree walk according to one embodiment.

FIG. 5 illustrates an embodiment of the MEE 150 that includes a request tracker circuit 510. The request tracker circuit 510 interfaces with an MEE tracker 520 (which tracks the progress of read and write requests sent to the MEE 150), a fill buffer 530 (which issues requests to memory for tree nodes used by tree walks), a cryptographic engine 540 (which performs encryption, decryption, and authentication of the tree nodes), and an MEE cache 550 (which caches the results of prior counter tree access; e.g., L0, L1, L2, versions, and embedded MACs). The request tracker circuit 510 includes outstanding request queues 531, 541 and 551 for the fill buffer 530, the cryptographic engine 540 and the MEE cache 550, respectively. The MEE 150 also includes memory 560 for storing the top level counters of a counter tree structure (e.g., the L3 counters of FIG. 2), and a finite state machine (FSM) 570 for performing parallelized tree walks.

When an incoming request arrives at the MEE 150, the MEE tracker 520 issues the request to the request tracker circuit 510, specifying the tree nodes to be used by the request for its tree walk. The request tracker circuit 510 tracks the requests that are sent to the MEE cache 550, the fill buffer 530 and the cryptographic engine 540, such that a request is sent to each of them only once. That is, no duplicated requests are sent to each of the MEE cache 550, the fill buffer 530 and the cryptographic engine 540. The request tracker circuit 510 tracks the requests by using the outstanding request queues 531, 541 and 551, which contain information on duplicate requests for the fill buffer 530, the cryptographic engine 540 and the MEE cache 550, respectively. The request tracker circuit 510 queries these outstanding queues 531, 541 and 551 about duplicate requests, and tracks duplicated requests in these queues such that their completion status can be sent to the corresponding tracker entries to allow the result from a previous request to be forwarded to a subsequent duplicated request. Thus, duplicated requests will be sent to the MEE components only once.

Referring again to the examples of FIGS. 3A-3C, the parallelized tree walk for read requests described herein removes unnecessary serialization in protected memory access. Request A and request B can be processed by the MEE 150 in parallel. With the request tracker circuit 510, even though these two requests share an entire tree branch, the same memory requests will not be sent to memory twice and the same cryptographic operations will not be performed more than once for these two requests. The request tracker circuit 510 ensures that while duplicate requests get a response as desired, they do not actually get executed more than once. For request C, the tree nodes containing version and L0 can be loaded and authenticated in parallel with request B's processing. Finally, request D, sharing only an L3 counter with the previous requests, can be loaded and authenticated at all levels along its branch in the counter tree. The examples show how the parallelized tree walk can achieve significant parallelization of read request processing while avoiding potentially duplicate work resulting from the parallelization. The higher the level of sharing, the more are the benefits. It is noted that since nodes higher in the counter tree represent a larger area of the protected memory, it is more likely for requests to share higher levels of the tree than lower levels of the tree.

The following description provides another example with more specific details. Assume that two read requests A and B share tree nodes of a counter tree branch that includes an L0 counter, an L1 counter, an L2 counter and an L3 counter, of which L0, L1 and L2 counters are in memory. To simplify the discussion, only the access to L0 is described in this example. In response to requests A and B, the MEE tracker 520 issues two requests for the same tree node address (L0) to memory. The request tracker circuit 510 notes that two MEE tracker entries requested the same address L0 and, therefore, records these requests in corresponding entries of the outstanding queue 531 (which tracks requests issued to memory). When the data for L0 returns, the MEE tracker entries waiting for L0 are notified via the request tracker circuit 510 to allow forward progress of the MEE requests. The other outstanding queues 541 and 551 are used for similar purposes. For example, when the requested data from memory returns, the request tracker circuit 510 signals both the MEE tracker entries that the requested data has returned, and the finite state machine running for each of the MEE tracker entries will send a request for authentication to the cryptographic engine 540 to verify the embedded MACs. The request tracker circuit 510 records the duplicate requests in the outstanding queue 541 for the cryptographic engine 540 and forwards the returned result to all the tracker entries sharing the same tree node once the cryptographic operation is completed. This ensures that the requests are not sent to the cryptographic engine 540 twice.

Figure 6:
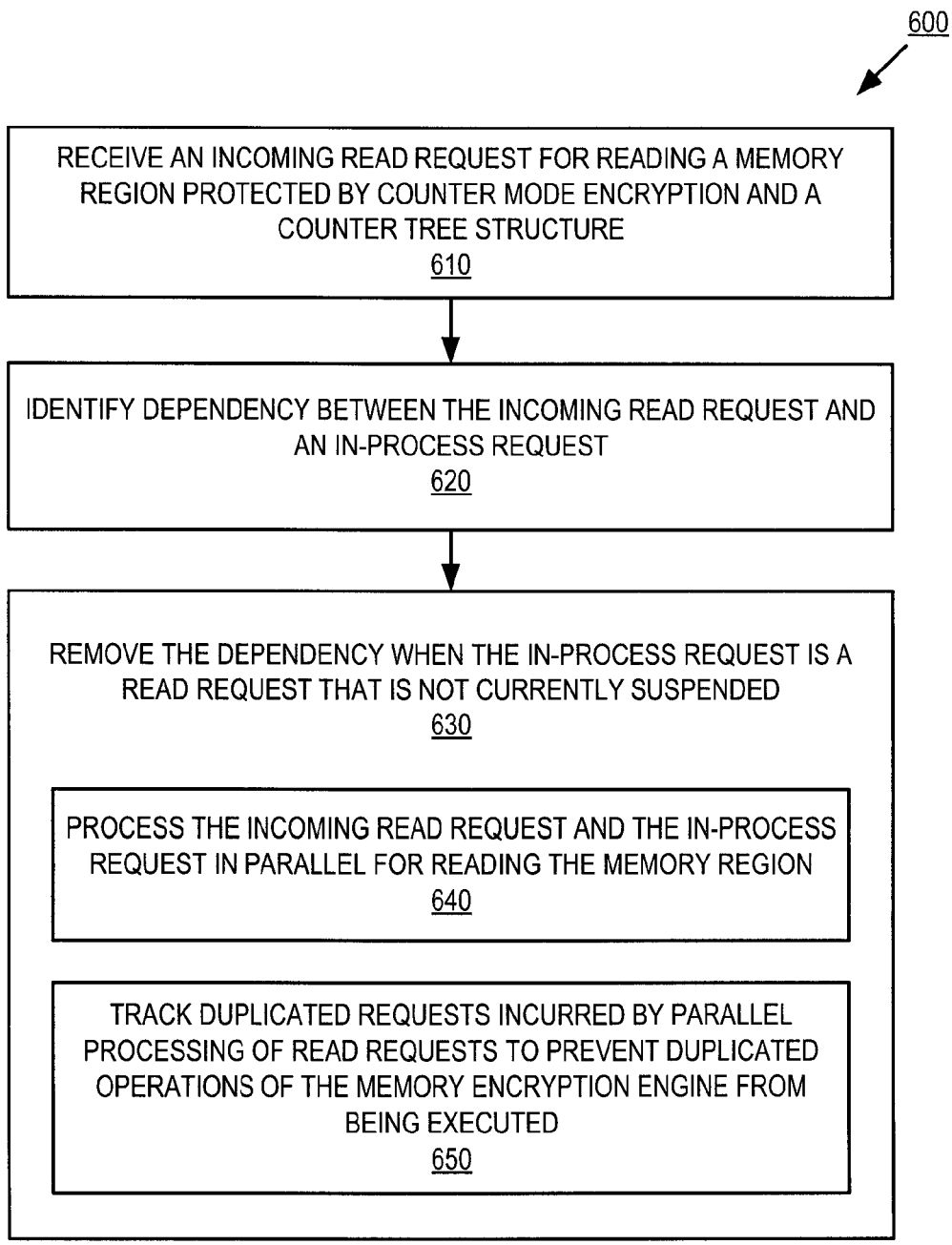
FIG. 6 is a flow diagram illustrating operations to be performed by a memory encryption engine responsive to an incoming read request according to one embodiment.

FIG. 6 is a block flow diagram of a method 600 for providing parallelized tree walks according to one embodiment. The method 600 begins with a processor (more specifically, e.g., the MEE 150 of FIGS. 1 and 5) receiving an incoming read request for reading a memory region protected by counter mode encryption and a counter tree structure (block 610). The processor identifies dependency between the incoming read request and an in-process request (block 620), and removes the dependency when the in-process request is a read request that is not currently suspended (block 630). By removing the dependency, the processor can process the incoming read request and the in-process request in parallel for reading the memory region (block 640). The processor is to track duplicated requests incurred by the parallel processing of read requests to thereby prevent duplicated operations from being executed by the memory encryption engine (block 650).

In various embodiments, the method 600 may be performed by a general-purpose processor, a special-purpose processor (e.g., a graphics processor or a digital signal processor), or another type of digital logic device or instruction processing apparatus. In some embodiments, the method 600 may be performed by the MEE 150 of FIGS. 1 and 5 in a processor, such as the embodiments shown in FIGS. 7-13. Moreover, the MEE 150 of FIGS. 1 and 5, as well as the processor, apparatus, or system shown in FIGS. 7-13 may perform embodiments of operations and methods either the same as, similar to, or different than those of the method 600.

Another aspect of embodiments of the invention is an extension to parallelized tree walk for write requests. The parallelized tree walk for reads as described above can be extended to writes to extract additional performance improvements. As the writes update counter values, the ordering of the write updates need to be enforced to prevent the requests from obtaining wrong counter values. Referring again to FIG. 5, in one embodiment, the request tracker circuit 510 includes logic 580 for locking tree nodes. The request tracker circuit 510 maintains a data structure of locked nodes, which stores the address of tree nodes that are being used by the currently in-process requests. When receiving a read request for the protected memory region, the request tracker circuit 510 is to issue a shared locking request to the read request's branch nodes in the counter tree structure to lock those tree nodes in a shared mode. When receiving a write request for the protected memory region, the request tracker circuit 510 is to issue an exclusive write locking request to the write request's branch nodes in the counter tree structure to lock those tree nodes in an exclusive mode. Based on the data structure of locked nodes, the MEE 150 is to suspend an incoming request if the incoming request causes an access to an exclusively-locked node (due to an in-process write), or if the incoming request is another write request that causes an access to a locked node (either in the shared mode or in the exclusive mode). In one embodiment, the request tracker circuit 510 is responsible for waking up the suspended request(s) on release of the lock.

Exemplary Core Architectures
In-Order and Out-of-Order Core Block Diagram
FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSE, AVX1, AVX2, etc.), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 8B:
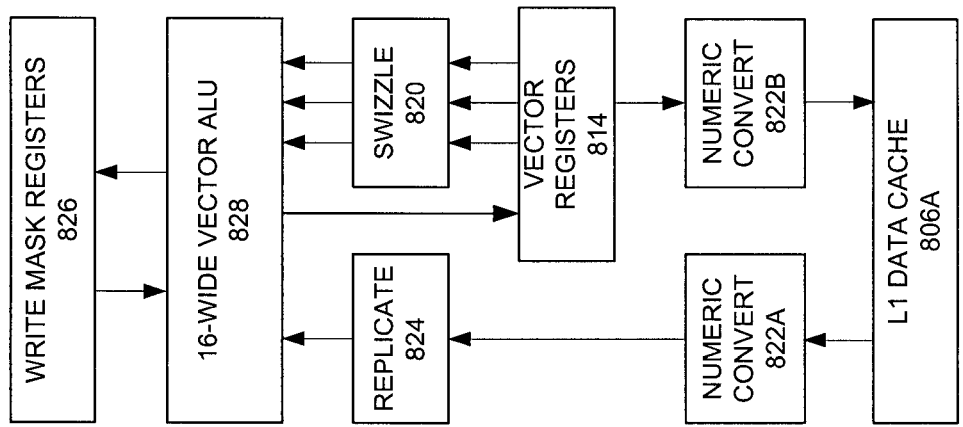
FIGS. 8A-B are block diagrams of a more specific exemplary in-order core architecture according to one embodiment.
Figure 8A:
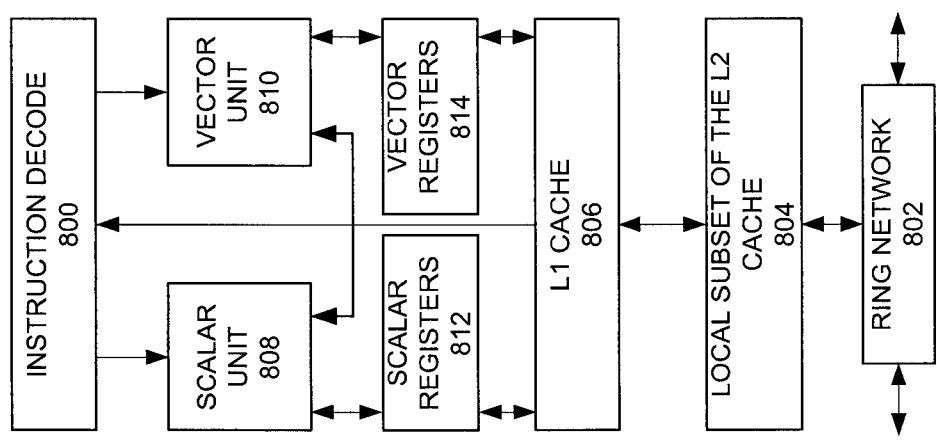

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
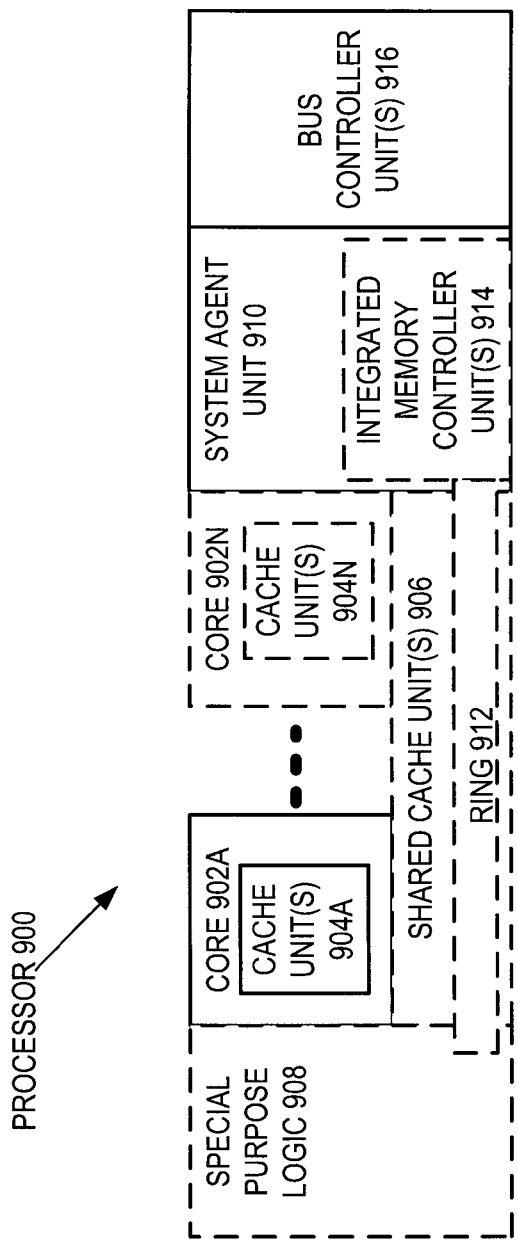
FIG. 9 is a block diagram of a processor according to one embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
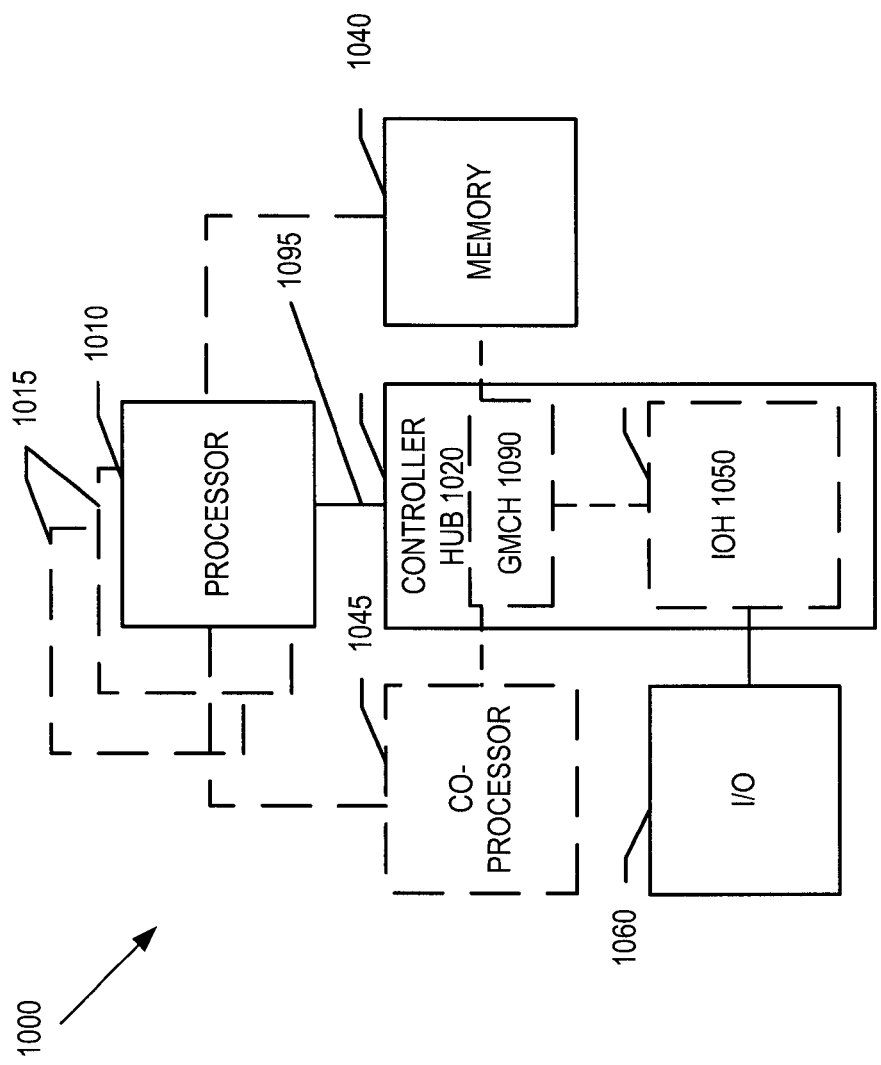
FIG. 10 is a block diagram of a system in accordance with one embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processor cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, micro-architectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
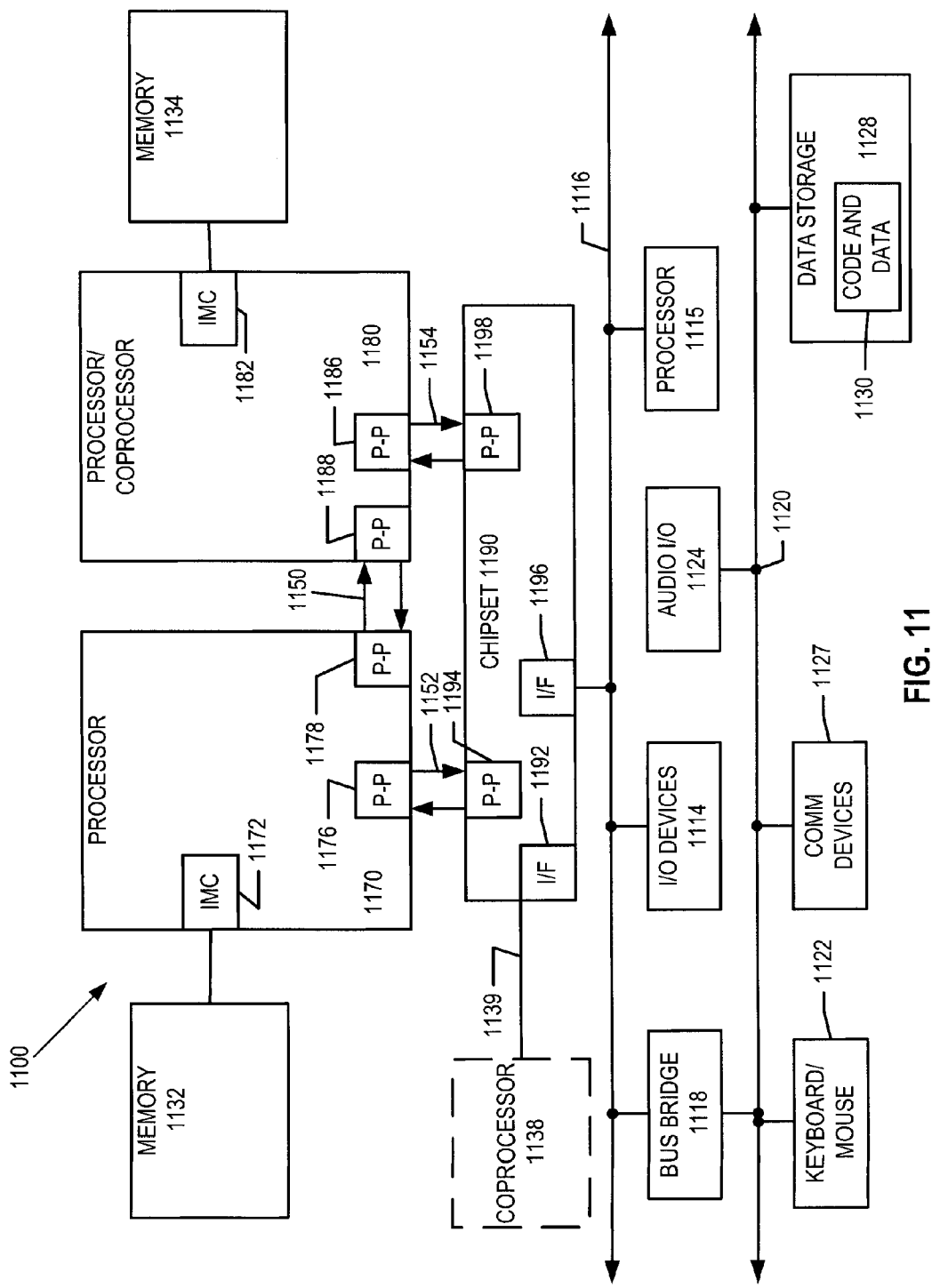
FIG. 11 is a block diagram of a second system in accordance with one embodiment.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
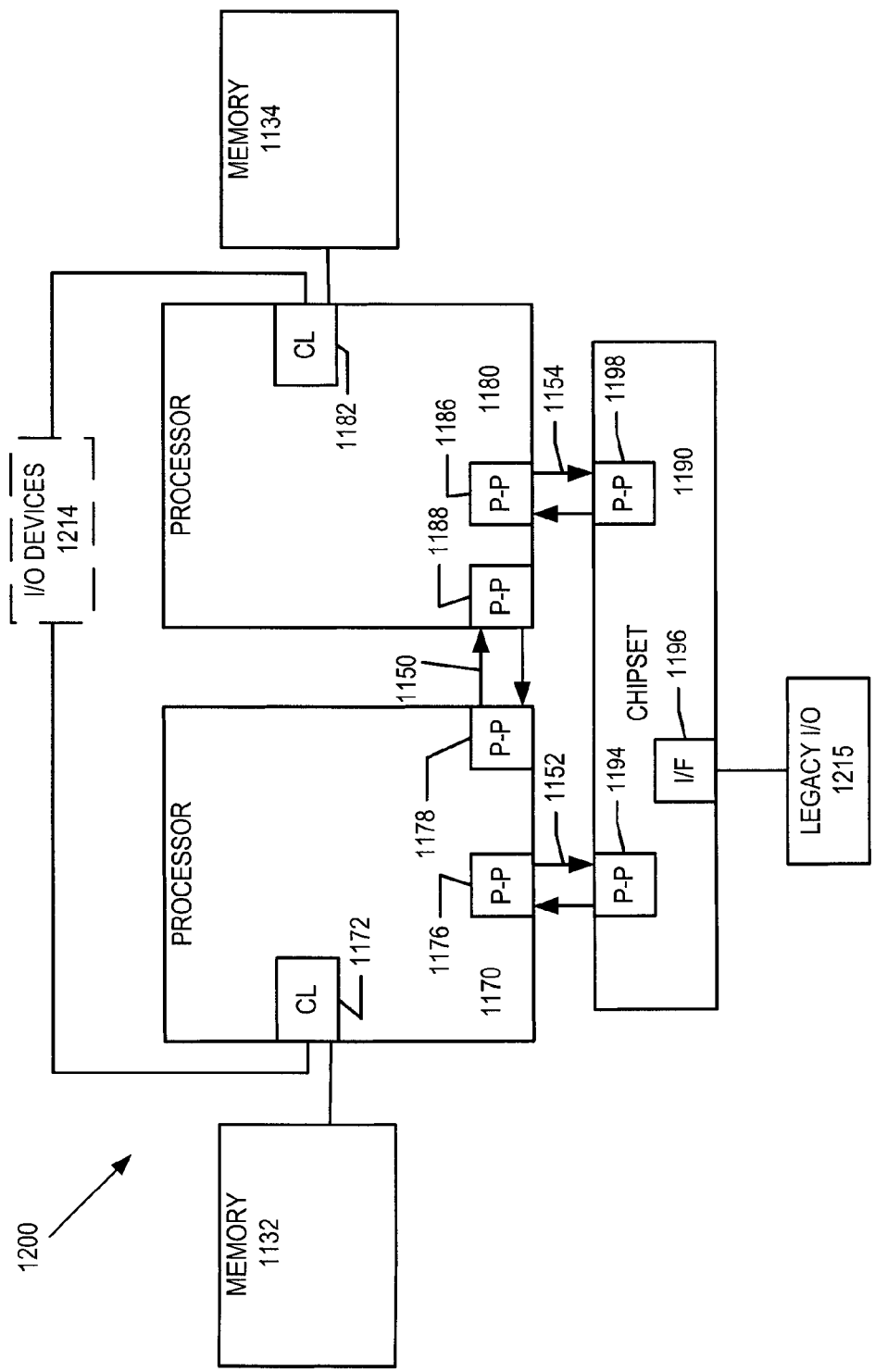
FIG. 12 is a block diagram of a third system in accordance with an embodiment of the invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
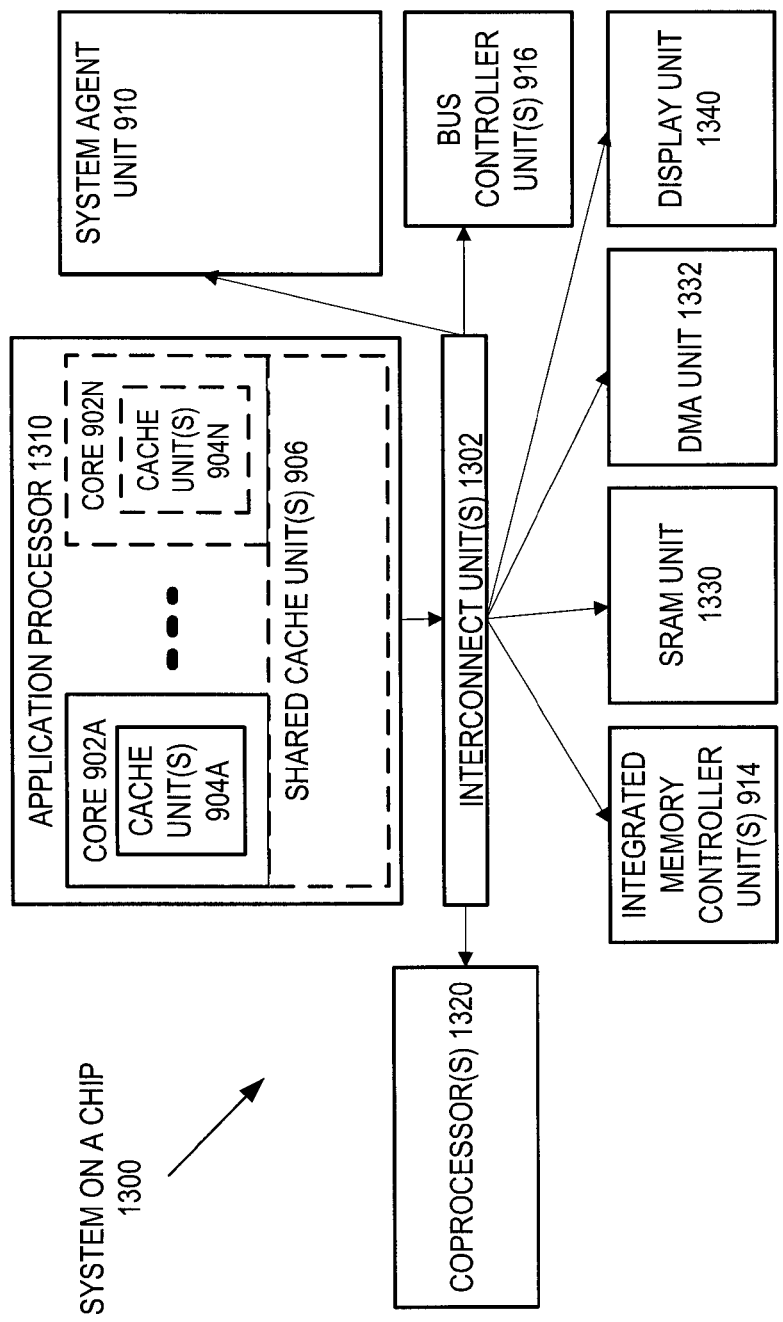
FIG. 13 is a block diagram of a system-on-a-chip (SoC) in accordance with one embodiment.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   one or more processing cores; and
   a memory encryption engine coupled to one or more processing cores, the memory encryption engine upon receiving an incoming read request for a memory region protected by counter mode encryption and a counter tree structure, performs a dependency check operation to identify dependency between the incoming read request and an in-process request and to remove the dependency when the in-process request is a read request that is not currently suspended.

2. The processor of claim 1, wherein the in-process request is a tail of a dependency chain and shares a tree node with the incoming read request in the counter tree structure.

3. The processor of claim 1, wherein the memory encryption engine is to process the incoming read request and the in-process request in parallel for reading the memory region.

4. The processor of claim 1, wherein the memory encryption engine further comprises a request tracker circuit to track duplicated requests incurred by parallel processing of read requests, and to prevent duplicated operations from being executed by the memory encryption engine.

5. The processor of claim 4, wherein the request tracker circuit is to track outstanding requests that are queued by components of the memory encryption engine.

6. The processor of claim 1, wherein the memory encryption engine when receiving a read request for the memory region, is to issue a shared locking request to a first subset of tree nodes in the counter tree structure that are to be accessed by the read request to thereby lock the first subset of tree nodes in a shared mode, and when receiving a write request for the memory region, is to issue an exclusive write locking request to a second subset of tree nodes in the counter tree structure that are to be accessed by the write request to thereby lock the second nodes in an exclusive mode.

7. The processor of claim 6, wherein the memory encryption engine is to suspend an incoming request if the incoming request causes an access to the second subset of tree nodes, or if the incoming request is another write request that causes an access to a locked node in the shared mode or in the exclusive mode.

8. A method comprising:
   receiving, by a memory encryption engine in a processor, an incoming read request for reading a memory region protected by counter mode encryption and a counter tree structure;
   identifying dependency between the incoming read request and an in-process request; and
   removing the dependency when the in-process request is a read request that is not currently suspended.

9. The method of claim 8 wherein the in-process request is a tail of a dependency chain and shares a tree node with the incoming read request in the counter tree structure.

10. The method of claim 8, wherein removing the dependency further comprises: processing the incoming read request and the in-process request in parallel for reading the memory region.

11. The method of claim 8, wherein removing the dependency further comprises: tracking duplicated requests incurred by parallel processing of read requests; and preventing duplicated operations from being executed by the memory encryption engine.

12. The method of claim 11, wherein tracking duplicated requests further comprising:
   tracking outstanding requests that are queued by components of the memory encryption engine.

13. The method of claim 8, further comprising:
   upon receiving a read request for the memory region, issuing a shared locking request to a first subset of tree nodes in the counter tree structure that are to be accessed by the read request to lock the first subset of tree nodes in a shared mode; and
   upon receiving a write request for the memory region, issuing an exclusive write locking request to a second subset of tree nodes in the counter tree structure that are to be accessed by the write request to lock the second subset of tree nodes in an exclusive mode.

14. The method of claim 13, further comprising:
   suspending an incoming request if the incoming request causes an access to the second subset of tree nodes, or if the incoming request is another write request that causes an access to a locked node in the shared mode or in the exclusive mode.

15. A system comprising:
   main memory that includes a memory region protected by counter mode encryption and a counter tree structure;
   one or more processing cores coupled to the main memory; and
   a memory encryption engine coupled to the one or more processing cores, the memory encryption engine upon receiving an incoming read request for the memory region, performs a dependency check operation to identify dependency between the incoming read request and an in-process request and to remove the dependency when the in-process request is a read request that is not currently suspended.

16. The system of claim 15, wherein the in-process request is a tail of a dependency chain and shares a tree node with the incoming read request in the counter tree structure.

17. The system of claim 15, wherein the memory encryption engine is to process the incoming read request and the in-process request in parallel for reading the memory region.

18. The system of claim 15, wherein the memory encryption engine further comprises a request tracker circuit to track duplicated requests incurred by parallel processing of read requests, and to prevent duplicated operations from being executed by the memory encryption engine.

19. The system of claim 18, wherein the request tracker circuit is to track outstanding requests that are queued by components of the memory encryption engine.

20. The system of claim 15, wherein the memory encryption engine when receiving a read request for the memory region, is to issue a shared locking request to a first subset of tree nodes in the counter tree structure that are to be accessed by the read request to thereby lock the first subset of tree nodes in a shared mode, and when receiving a write request for the memory region, is to issue an exclusive write locking request to a second subset of tree nodes in the counter tree structure that are to be accessed by the write request to thereby lock the second nodes in an exclusive mode.

21. The system of claim 20, wherein the memory encryption engine is to suspend an incoming request if the incoming request causes an access to the second subset of tree nodes, or if the incoming request is another write request that causes an access to a locked node in the shared mode or in the exclusive mode.

\* \* \* \* \*